United States Patent [19]

Gray

[11] 4,447,793

[45] May 8, 1984

[54] ROTARY ACTUATORS

[75] Inventor: William P. Gray, West Lothian, Scotland

[73] Assignee: Racal-Mesl Microwave Limited, Newbridge, Scotland

[21] Appl. No.: 492,039

[22] Filed: May 6, 1983

[30] Foreign Application Priority Data

May 13, 1982 [GB] United Kingdom ................. 8213963

[51] Int. Cl.3 ........................ H01P 1/10; H02K 33/00

[52] U.S. Cl. ..................................... 333/106; 310/36; 310/156; 335/272

[58] Field of Search ........................... 310/36, 38, 156; 335/272; 340/815.24, 815.26; 333/101, 105, 106, 109

[56] References Cited

U.S. PATENT DOCUMENTS

| | | | |
|---|---|---|---|
| 2,836,773 | 5/1958 | Skrobisch | 335/272 X |
| 2,895,095 | 7/1959 | Guyton | 310/36 X |
| 2,960,643 | 11/1960 | Boyd | 310/38 X |
| 3,419,827 | 12/1968 | Webb | 333/106 |
| 3,959,672 | 5/1976 | Walker et al. | 310/36 |
| 4,242,652 | 12/1980 | Shishido et al. | 333/106 |
| 4,275,371 | 6/1981 | Vogel | 335/272 |
| 4,287,457 | 9/1981 | Takemura | 310/36 X |
| 4,370,631 | 1/1983 | Gerber et al. | 333/106 |

FOREIGN PATENT DOCUMENTS 898033 7/1949 Fed. Rep. of Germany ........ 310/36

*Primary Examiner*—Mark O. Budd

*Attorney, Agent, or Firm*—Leydig, Voit, Osann, Mayer & Holt, Ltd.

[57] ABSTRACT

An actuator has a rotor with permanently magnetized North and South poles. A housing supports three pole members having respective coils and pole pieces. The first pole piece is always a North pole but the coils on the second and third pole pieces are arranged such that each can be of either polarity with the other simultaneously being of the opposite polarity. The rotor therefore has two stable positions, one when the second pole piece is a North pole and the third pole piece is a South pole and the other being 120° from this position in the clockwise direction (when the second pole piece is a South pole and the third pole piece is a North pole). The rotor movement may however be stopped 15° short of each such position by mechanical detents, so as to limit the maximum angular movement to 90°. The actuator may be used to drive a switchable microwave coupling arrangement.

11 Claims, 5 Drawing Figures

ROTARY ACTUATORS

BACKGROUND OF THE INVENTION

The invention relates to electrical actuators capable of generating an angular torque, referred to below as rotary actuators. In one particular example, to be more specifically described, the invention relates to rotary actuators which may be used to operate a microwave switch, that is, a switch capable of moving a microwave coupling arrangement between two discrete positions in each of which it couples a respective path for microwave energy; however, the invention is not limited to rotary actuators for such applications.

BRIEF SUMMARY OF THE INVENTION

According to the invention, there is provided an angular movement actuator, comprising a first element having two predetermined portions which are magnetised with opposite magnetic polarities, and a second element providing first, second and third pole means spaced apart by predetermined angular distances, one said element being at least partially embraced by the other and the two elements being mounted for relative angular movement, the pole means being magnetisable into a first state in which the first pole means is of North polarity and the second pole means is of South polarity and a second state in which the first pole means is of South polarity and the second pole means is of North polarity, whereby the elements move to a first or second predetermined relative angular position according to the state of magnetisation of the first and second pole means, the third pole means being magnetisable so as always to have the same polarity.

According to the invention, there is also provided a rotary actuator, comprising a generally cylindrical and solid rotor substantially one semi-cylindrical part of which is permanently magnetised to provide a North pole and the other semi-cylindrical part of which is permanently magnetised to provide a South pole, a stationary housing, three pole members supported on the housing and spaced 120° apart around the rotor so as to provide magnetic paths linking with the rotor, electrically energisable coils on the pole members, means for energising the coils so that a first one of the pole members presents either magnetic polarity to the rotor, the second one of the pole members always presents the opposite magnetic polarity to the first one, and the third pole member always presents an unchanging magnetic polarity, whereby the rotor tends to assume one or other of two minimum reluctance positions according to the magnetic polarities presented by the first and second pole members, the two said positions being 120° apart and each such position being a position in which one said portion of the rotor is adjacent the particular one of the first and second pole members presenting the opposite magnetic polarity to itself and the other said portion is substantially midway between the other two pole members, and means mechanically stopping the movement of the rotor substantially 15° before each said position so as to limit the maximum rotation of the rotor to substantially 90°.

A rotary actuator embodying the invention will now be described, by way of example only, with reference to the accompanying diagrammatic drawings in which.

DESCRIPTION OF PREFERRED EMBODIMENTS

Figure 1:
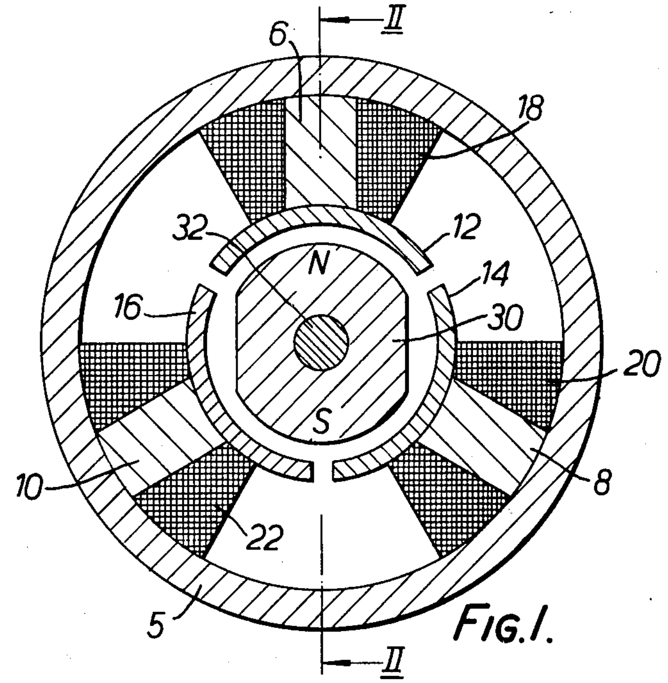
FIG. 1 is a cross-section through the rotary actuator on the line I—I of FIG. 2.
Figure 2:
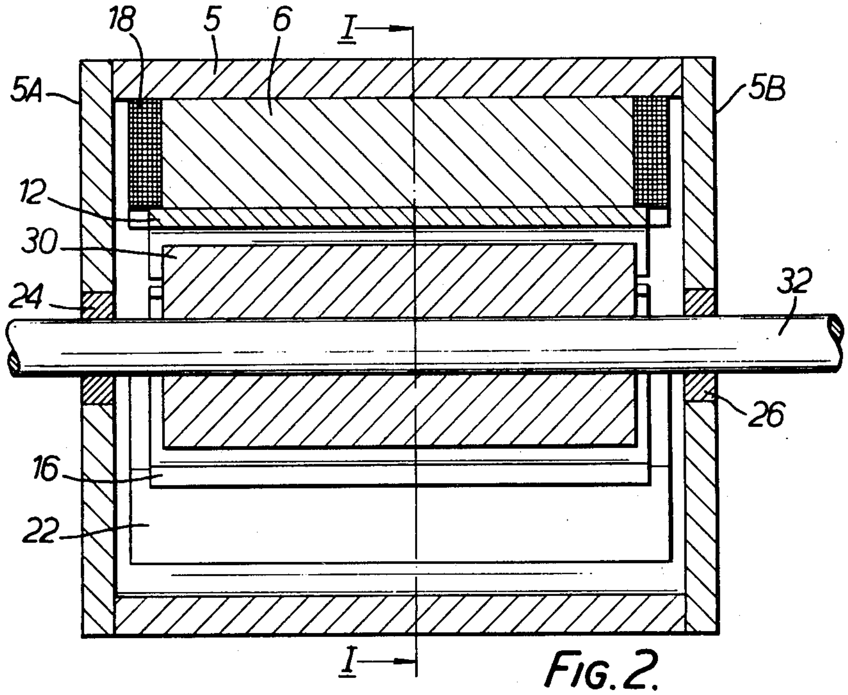
FIG. 2 is a longitudinal section through the actuator on the line II—II of FIG. 1.

As shown in FIGS. 1 and 2, the actuator has a housing 5 made of material providing a low reluctance magnetic path and supporting magnetic pole members 6, 8 and 10 which terminate in respective part cylindrically shaped pole pieces 12, 14 and 16. The pole members 6, 8 and 10 are provided with coils 18, 20 and 22.

Rotatably mounted within the ends 5A and 5B (see FIG. 2) of the housing 5, by means of bearings 24 and 26 is a permanent magnet rotor 30, which is permanently magnetised to provide North and South poles as shown in FIG. 1. The rotor 30 has an output shaft 32 (see FIG. 2).

In a manner to be more specifically described, the coils 18 and 20 can be simultaneously energised in either of two possible configurations; one configuration makes pole piece 12 of pole member 6 a North pole and pole piece 14 of pole member 8 a South pole, and the other configuration makes pole piece 12 a South pole and pole piece 14 a North pole. The arrangement is such that whenever coils 18 and 20 are energised, so is coil 22, but coil 22 is always energised so as to make pole piece 16 of pole member 10 a North pole. When coils 18 and 20 are energised so that pole piece 12 is a South pole and pole piece 14 is a North pole, the rotor 30 has a stable position as shown in FIG. 1, with the North pole of the rotor adjacent the South pole of pole piece 12 and with the South pole of the rotor midway between the North poles provided by the pole pieces 14 and 16, this providing the flux path of lowest magnetic reluctance. If the energisation of the coils is changed, so as to make pole piece 12 a North pole and pole piece 14 a South pole, the rotor 30 will move through 120° in a clockwise direction to a new stable position of minimum magnetic reluctance, with the North pole of the rotor now adjacent the South pole of pole piece 14 and with the South pole of the rotor midway between the North poles provided by the pole pieces 12 and 16.

Advantageously, however, the rotor is prevented from turning through the full 120° and is limited in fact to 90° of movement, such as by means of detents (not shown). In other words, when moving anti-clockwise, the rotor 30 is not permitted to reach the position shown in FIG. 1 but is stopped 15° clockwise of this position. Similarly, when moving clockwise to the other stable position (120° clockwise of the position shown in FIG. 3), the rotor is in fact stopped 15° short. Therefore, when the energisation of the coils 18 and 20 is altered, the rotor moves from one of the 90°-apart angular positions to the other one and is held in that position by the angular torque which the magnetic flux is still exerting on the rotor, attempting to turn it the further 15° into the minimum flux path length position.

Figure 3:
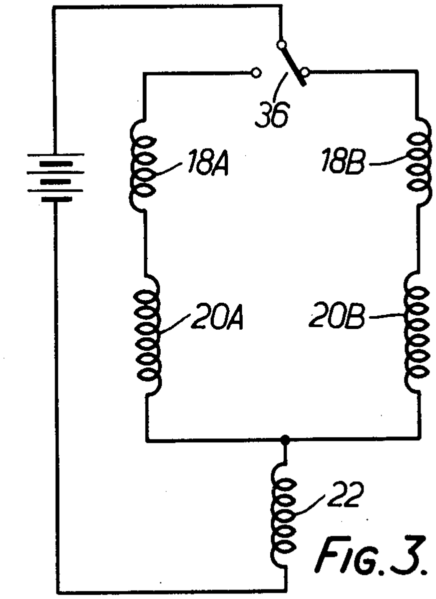
FIG. 3 is a schematic circuit diagram of the rotary actuator.

FIG. 3 illustrates the manner in which the coils 18, 20 and 22 are electrically energised. Coil 18 in fact comprises two bifilar windings 18A and 18B, and likewise coil 20 comprises two bifilar windings 20A and 20B.

Coil 22 is a single coil. A d.c. source supplies electrical power to the coils through a change-over switch 36. It will therefore be seen that, because of the way that the bifilar windings on each of the pole members 6 and 8 are connected, change-over of the switch 36 will cause the required change in polarity of these pole members.

The torque/angle characteristic of the actuator is such that the torque on the rotor 30 is at a maximum when it is halfway between its two final angular positions, so that the torque is falling towards a minimum when the rotor reaches each limiting position. This helps to ensure that the rotor comes smoothly to rest without bouncing on the stop or detent. The third pole member 10 is particularly advantageous because its presence increases the starting torque and reduces the torque when the rotor comes towards its limiting position.

The rotor actuator described may be used for any suitable purpose where angular movement between two positions is required.

Figure 4:
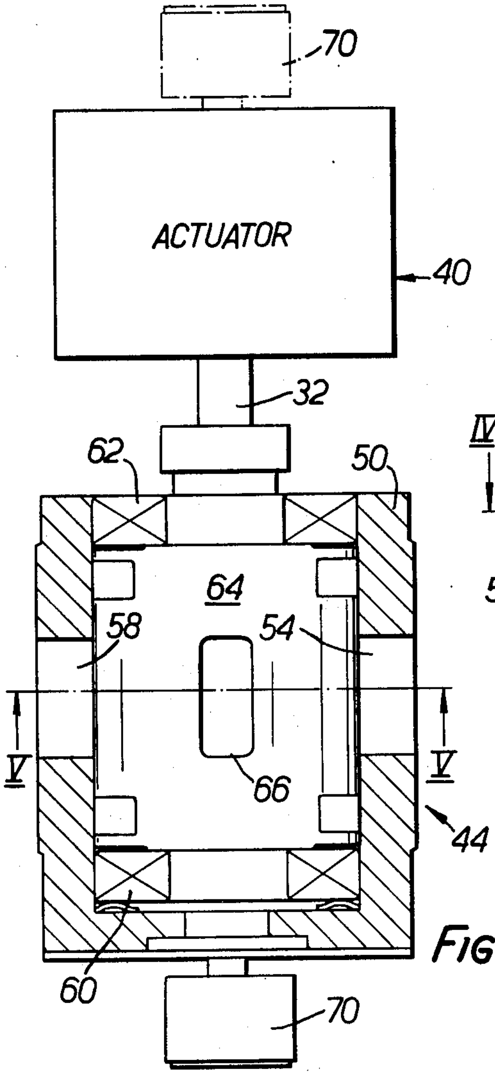
FIG. 4 is a longitudinal section on the line IV—IV of FIG. 5 through a microwave switch which may be operated by the rotary actuator.
Figure 5:
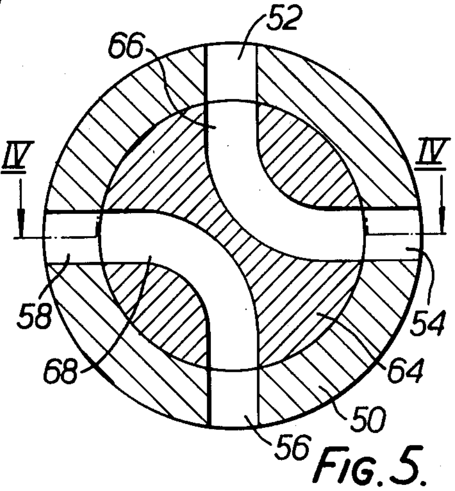
FIG. 5 is a cross-section on the line V—V of FIG. 4 of the microwave switch of FIG. 4.

One particular but non-limiting example of a suitable use is shown in FIGS. 4 and 5 where the actuator itself is represented by the block 40 and is shown with its output shaft 32 driving a microwave coupling arrangement 44 which is shown diagrammatically only.

As shown in FIG. 4, the microwave coupling arrangement comprises a housing 50 of generally hollow cylindrical form having four ports 52, 54, 56 and 58, shown in FIG. 5 (only two of these being shown in FIG. 4). The housing 50 rotatably supports, by means of bearings 60 and 62, a rotor 64 of suitable material which is machined to provide curved waveguide channels 66 and 68.

The rotor 64 is connected to be angularly turned by the shaft 32.

The rotor 64 is so mounted on the shaft 32 that in one extreme angular position of the shaft 32, waveguide channel 66 connects ports 52 and 54 and waveguide channel 68 connects ports 56 and 58, as shown particularly in FIG. 5. In the other extreme position of the shaft 32, waveguide channel 66 connects ports 54 and 56 and waveguide channel 68 connects ports 52 and 58.

A manual override knob 70 may be provided to enable the rotor 64 to be indexed manually between its two angular positions. Instead, however, the knob 70 would be attached to the opposite end of the arrangement, that is, to the end of the rotor shaft 32.

Although the actuator has been described and illustrated with the permanently magnetised North and South poles on the rotor and with the three pole pieces 10, 11 and 14 on the stationary armature surrounding the rotor, the arrangement could be reversed. In other words, the rotor part could carry the three pole pieces 10, 12, 14 (and of course the corresponding poles and coils) which would be angularly spaced at 120° and projecting outwardly towards the armature which would comprise two part-cylindrical members providing permanently North and South poles respectively and at least partially embracing the rotor.

What is claimed is:

1. An angular movement actuator, comprising a first element having two predetermined portions which are magnetised with opposite magnetic polarities, and a second element providing first, second and third pole means spaced apart by predetermined angular distances, one said element being at least partially embraced by the other and the two elements being mounted for relative angular movement, the pole means being magnetisable into a first state in which the first pole means is of North polarity and the second pole means is of South polarity and a second state in which the first pole means is of South polarity and the second pole means is of North polarity, whereby the elements move to a first or second predetermined relative angular position according to the state of magnetisation of the first and second pole means, the third pole means magnetisable so as always to have the same polarity.

2. An actuator according to claim 1, in which the first and second pole means are angularly spaced apart by substantially 120°.

3. An actuator according to claim 1, including mechanical stop means mounted so as to limit the maximum relative angular movement.

4. An actuator according to claim 2, including mechanical stop means so mounted as to limit the maximum relative angular movement to substantially 90°, the said 90° lying symmetrically within the 120° angular distance between the first and second pole means.

5. An actuator according to claim 1, including respective coils mounted to magnetise the first and second pole means, each of the coils comprising two bifilar windings which are electrically connected so that, in one said state of magnetisation, one of the windings of one of the coils is electrically energised in series with one of the windings of the other of the coils, and in the second state of magnetisation, the other of the windings of one of the coils is electrically energised in series with the other of the windings of the other of the coils.

6. An actuator according to claim 1, in which the first element is a rotor and the second element is an armature supporting the pole means externally of the rotor.

7. An actuator according to claim 1, in which the second element is a rotor and the first element is an armature supporting the said portions externally of the rotor.

8. An actuator according to claim 6, in combination with a microwave coupling arrangement having a rotatable element rotatable between two positions substantially 90° apart, the coupling arrangement coupling a different microwave path in each such position, and means connecting the said rotor to drive the rotatable element.

9. An actuator according to claim 7, in combination with a microwave coupling arrangement having a rotatable element rotatable between two positions substantially 90° apart, the coupling arrangement coupling a different microwave path in each such position, and means connecting the said rotor to drive the rotatable element.

10. A rotary actuator, comprising a generally cylindrical and solid rotor substantially one semi-cylindrical part of which is permanently magnetised to provide a North pole and the other semi-cylindrical part of which is permanently magnetised to provide a South pole, a stationary housing, three pole members supported on the housing and spaced 120° apart around the rotor so as to provide magnetic paths linking with the rotor, electrically energisable coils on the pole members, means for energising the coils so that a first one of the pole members presents either magnetic polarity to the rotor, the second one of the pole members always presents the opposite magnetic polarity to the first one, and the third pole member always presents an unchanging magnetic polarity, whereby the rotor tends to assume one or other of two minimum reluctance positions according to the magnetic polarities presented by the first and second pole members, the two said positions being 120° apart and each such position being a position in which one said portion of the rotor is adjacent the particular one of the first and second pole members presenting the opposite magnetic polarity to itself and the other said portion is substantially midway between the other two pole members, and means mechanically stopping the movement of the rotor substantially 15° before each said position so as to limit the maximum rotation of the rotor to substantially 90°.

11. An actuator according to claim 10, in combination with a microwave coupling arrangement having a rotatable element rotatable btween two positions substantially 90° apart, the coupling arrangement coupling a different microwave path in each such position, and means connecting the said rotor to drive the rotatable element.

* * * * *